US012746778B2

(12) United States Patent
Gorrell

(10) Patent No.: US 12,746,778 B2
(45) Date of Patent: Sep. 29, 2026

(54) CLAMP RING ASSEMBLY INCLUDING INSERTS FOR USE IN TIRE FABRICATION

(71) Applicant: Christopher M. Gorrell, Cedar Hill, TN (US)

(72) Inventor: Christopher M. Gorrell, Cedar Hill, TN (US)

( * ) Notice: Subject to any disclaimer, the term of this patent is extended or adjusted under 35 U.S.C. 154(b) by 703 days.

(21) Appl. No.: 17/990,992

(22) Filed: Nov. 21, 2022

(65) Prior Publication Data

US 2023/0158828 A1 May 25, 2023

Related U.S. Application Data

(60) Provisional application No. 63/281,883, filed on Nov. 22, 2021.

(51) Int. Cl.
*B60B 3/08* (2006.01)
*B60B 23/10* (2006.01)

(52) U.S. Cl.
CPC ................ *B60B 3/08* (2013.01); *B60B 23/10* (2013.01); *B60B 2310/306* (2013.01)

(58) Field of Classification Search
CPC ................ B29D 30/06; B29D 30/0654; B29D 30/0601; B29D 30/0602; B29D 30/0645; B29D 2030/646; B29D 2030/0659; B29D 2030/2621
See application file for complete search history.

(56) References Cited

FOREIGN PATENT DOCUMENTS

| | | | | |
|---|---|---|---|---|
| KR | 101230555 B1 * | 2/2013 | ......... | B29D 30/0654 |
| KR | 101525939 B1 * | 6/2015 | ............. | B29C 35/02 |
| KR | 101601664 B1 * | 3/2016 | ......... | B29D 30/0602 |
| KR | 102121377 B1 * | 6/2020 | ......... | B29D 30/0662 |

OTHER PUBLICATIONS

PTL Fabricators Facility, Clarksville, TN, Images of Prior Art Clamp Rings, Oct. 2, 2021 (3 pp).
Banseok—Hankook Tire Facility, Clarksville, TN, Images of Prior Art Tire Inflation Assembly, Nov. 17, 2021 (3 pp).

* cited by examiner

*Primary Examiner* — Cedrick S Williams
(74) *Attorney, Agent, or Firm* — Young Basile Hanlon & MacFarlane, P.C.

(57) ABSTRACT

A clamp ring assembly is disclosed for use during tire fabrication, which includes: a first clamp ring that defines a first channel and which includes a plurality of first openings that are located within the first channel; a first insert ring that is configured for removable positioning within the first channel and which includes a plurality of second openings; a second clamp ring that defines a second channel and which includes a plurality of third openings that are located within the second channel; and a second insert ring that is configured for removable positioning within the second channel and which includes a plurality of fourth openings.

20 Claims, 10 Drawing Sheets

CLAMP RING ASSEMBLY INCLUDING INSERTS FOR USE IN TIRE FABRICATION

CROSS-REFERENCE TO RELATED APPLICATION(S)

This application claims the benefit of and priority to U.S. Provisional Patent Application Ser. No. 63/281,883, filed Nov. 22, 2021, the entire contents of which are hereby incorporated by reference.

TECHNICAL FIELD

The present disclosure relates to tire fabrication (manufacture) and, more specifically, to a clamp ring assembly that is configured for use during the fabrication of vehicle tires.

BACKGROUND

Clamp ring assemblies are commonly used during tire fabrication (e.g., to secure the tire) and typically include upper and lower clamp rings. The upper and lower clamp rings include threaded openings that are configured to receive bolts (e.g., to secure the tire and the clamp rings together), which are arranged into one or more bolt patterns. Over time, as a result of the repeated insertion and removal of the bolts (e.g., during connection and disconnection of the tire), the threading on the openings experiences wear (e.g., stripping or other such deterioration), which results in failure of the clamp rings and, ultimately, disposal of the clamp ring assembly, thereby adding significantly to the overall cost of tire fabrication. In an effort to increase the usable life of clamp ring assemblies, attempts have been made to create new threaded openings by welding additional material(s) and re-tapping the clamp rings. Such efforts, however, have proved futile in that welding increases the hardness of the clamp rings, thereby inhibiting (if not entirely preventing) proper tapping.

The present disclosure addresses these deficiencies and provides for an improved clamp ring assembly that includes removable and replaceable insert rings for the upper and lower clamp rings, which eliminates any need to re-tap the clamp rings and improves the usable life of the clamp ring assembly.

SUMMARY

In one aspect of the present disclosure, a clamp ring assembly is disclosed for use during tire fabrication. The clamp ring assembly includes: a first clamp ring that defines a first channel and which includes a plurality of first openings that are located within the first channel; a first insert ring that is configured for removable positioning within the first channel and which includes a plurality of second openings; a second clamp ring that defines a second channel and which includes a plurality of third openings that are located within the second channel; and a second insert ring that is configured for removable positioning within the second channel and which includes a plurality of fourth openings.

In certain embodiments, the second openings may be configured in correspondence with the first openings such that the first openings and the second openings are rotationally alignable.

In certain embodiments, the fourth openings may be configured in correspondence with the third openings such that the third openings and the fourth openings are rotationally alignable.

In certain embodiments, the plurality of first openings may be arranged so to define a first bolt pattern; a second bolt pattern; and a third bolt pattern.

In certain embodiments, the second bolt pattern may be rotationally offset from the first bolt pattern.

In certain embodiments, the third bolt pattern may be rotationally offset from the second bolt pattern.

In certain embodiments, the plurality of second openings may be arranged so to define a fourth bolt pattern; a fifth bolt pattern; and a sixth bolt pattern.

In certain embodiments, the fifth bolt pattern may be rotationally offset from the fourth bolt pattern.

In certain embodiments, the sixth bolt pattern may be rotationally offset from the fifth bolt pattern.

In certain embodiments, the plurality of third openings may be arranged so to define a seventh bolt pattern; an eighth bolt pattern; and a ninth bolt pattern.

In certain embodiments, the eighth bolt pattern may be rotationally offset from the seventh bolt pattern.

In certain embodiments, the ninth bolt pattern may be rotationally offset from the eighth bolt pattern.

In certain embodiments, the plurality of fourth openings may be arranged so to define a tenth bolt pattern; an eleventh bolt pattern; and a twelfth bolt pattern.

In certain embodiments, the eleventh bolt pattern may be rotationally offset from the tenth bolt pattern.

In certain embodiments, the twelfth bolt pattern may be rotationally offset from the eleventh bolt pattern.

In certain embodiments, the first clamp ring may include twenty-four of the first openings.

In certain embodiments, the first bolt pattern, the second bolt pattern, and the third bolt pattern may each include eight of the first openings.

In certain embodiments, the first insert ring may include twenty-four of the second openings.

In certain embodiments, the fourth bolt pattern, the fifth bolt pattern, and the sixth bolt pattern may each include eight of the second openings.

In certain embodiments, the second clamp ring may include twenty-four of the third openings.

In certain embodiments, the eighth bolt pattern, the ninth bolt pattern, and the tenth bolt pattern may each include eight of the third openings.

In certain embodiments, the second insert ring may include twenty-four of the fourth openings.

In certain embodiments, the tenth bolt pattern, the eleventh bolt pattern, and the twelfth bolt pattern may each include eight of the fourth openings.

In certain embodiments, the first openings may be both threaded and non-threaded.

In certain embodiments, the third openings may both threaded and non-threaded.

In certain embodiments, the second openings may be both threaded and non-threaded.

In certain embodiments, the fourth openings may be both threaded and non-threaded.

In certain embodiments, the first openings in the first bolt pattern may be threaded.

In certain embodiments, the first openings in the second bolt pattern and the third bolt pattern may be non-threaded.

In certain embodiments, the third openings in the seventh bolt pattern may be threaded.

In certain embodiments, the third openings in the eighth bolt pattern and the ninth bolt pattern may be non-threaded.

In certain embodiments, the first clamp ring and the first insert ring may be removably connectable via the insertion of a first set of bolts through the fourth bolt pattern and into the first bolt pattern.

In certain embodiments, the second clamp ring and the second insert ring may be removably connectable via the insertion of a second set of bolts through the tenth bolt pattern and into the seventh bolt pattern.

In another aspect of the present disclosure, a clamp ring assembly is disclosed for use during tire fabrication. The clamp ring assembly includes: a first clamp ring; a first insert ring; a second clamp ring; and a second insert ring.

The first clamp ring includes: a first bolt pattern with threaded openings; a second bolt pattern with non-threaded openings; and a third bolt pattern with non-threaded openings.

The first insert ring includes: a fourth bolt pattern with non-threaded openings; a fifth bolt pattern with threaded openings; and a sixth bolt pattern with threaded openings. The first insert ring is configured for removable connection to the first clamp ring via the insertion of a first set of bolts through the fourth bolt pattern and into the first bolt pattern.

The second clamp ring includes: a seventh bolt pattern with threaded openings; an eighth bolt pattern with non-threaded openings; and a ninth bolt pattern with non-threaded openings.

The second insert ring includes: a tenth bolt pattern with non-threaded openings; an eleventh bolt pattern with threaded openings; and a twelfth bolt pattern with threaded openings. The second insert ring is configured for removable connection to the second clamp ring via the insertion of a second set of bolts through the tenth bolt pattern and into the seventh bolt pattern.

In certain embodiments, the openings in the first insert ring may be configured in correspondence with the openings in the first clamp ring and the openings in the second insert ring may be configured in correspondence with the openings in the second clamp ring.

In certain embodiments, the first insert ring and the second insert ring may be identical.

In certain embodiments, the second bolt pattern may be rotationally offset from the first bolt pattern and the third bolt pattern may be rotationally offset from the second bolt pattern.

In certain embodiments, the fifth bolt pattern may be rotationally offset from the fourth bolt pattern and the sixth bolt pattern may be rotationally offset from the fifth bolt pattern.

In certain embodiments, the eighth bolt pattern may be rotationally offset from the seventh bolt pattern and the ninth bolt pattern may be rotationally offset from the eighth bolt pattern.

In certain embodiments, the eleventh bolt pattern may be rotationally offset from the tenth bolt pattern and the twelfth bolt pattern may be rotationally offset from the eleventh bolt pattern.

In certain embodiments, each of the first bolt pattern, the second bolt pattern, the third bolt pattern, the fourth bolt pattern, the fifth bolt pattern, the sixth bolt pattern, the seventh bolt pattern, the eighth bolt pattern, the ninth bolt pattern, the tenth bolt pattern, the eleventh bolt pattern, and the twelfth bolt pattern may include eight openings.

In another aspect of the present disclosure, a method of assembling a clamp ring assembly is disclosed that includes removably connecting a first insert ring to a first clamp ring and removably connecting a second insert ring to a second clamp ring.

In certain embodiments, removably connecting the first insert ring to the first clamp ring may include positioning the first insert ring within a first channel defined by the first clamp ring.

In certain embodiments, removably connecting the second insert ring to the second clamp ring may include positioning the second insert ring within a second channel defined by the second clamp ring.

In certain embodiments, removably connecting the first insert ring to the first clamp ring may include inserting a first set of bolts into non-threaded openings defined by the first insert ring and into threaded openings defined by the first clamp ring.

In certain embodiments, removably connecting the second insert ring to the second clamp ring may include inserting a second set of bolts into non-threaded openings defined by the second insert ring and into threaded openings defined by the second clamp ring.

BRIEF DESCRIPTION OF THE DRAWINGS

According to common practice, the various features of the drawings may not be to scale and may be arbitrarily expanded or reduced for clarity.

DETAILED DESCRIPTION

The present disclosure describes an improved clamp ring assembly for use in the fabrication of vehicle tires. The clamp ring assembly described herein includes: an upper clamp ring, an upper insert ring; a lower clamp ring; and a lower insert ring. The upper and lower insert rings are configured for removable connection to (engagement with) the upper and lower clamp rings, respectively, and increase the usable life of the clamp ring assembly by eliminating the need to replace the upper and/or lower clamp rings that would otherwise result as a result of wear.

With reference to FIGS. 1A, 1, 2, and 3, a known clamp ring assembly 10 is illustrated, which includes a lower (first) clamp ring 12 and an upper (second) clamp ring 14.

Figure 1A:
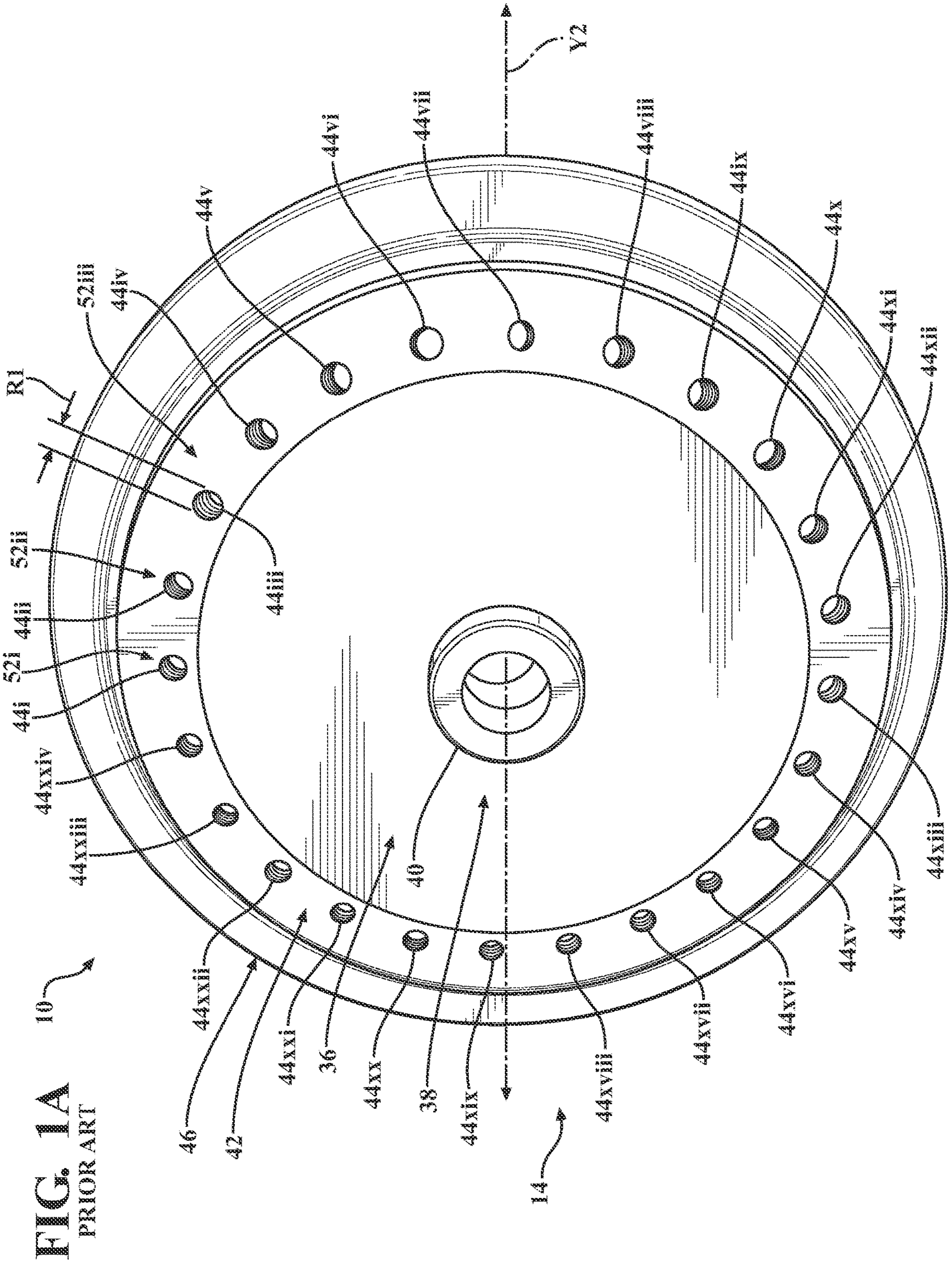
FIG. 1A PRIOR ART
FIG. 1A is a perspective view of an upper clamp ring in a known (prior art) clamp ring assembly.
Figure 1B:
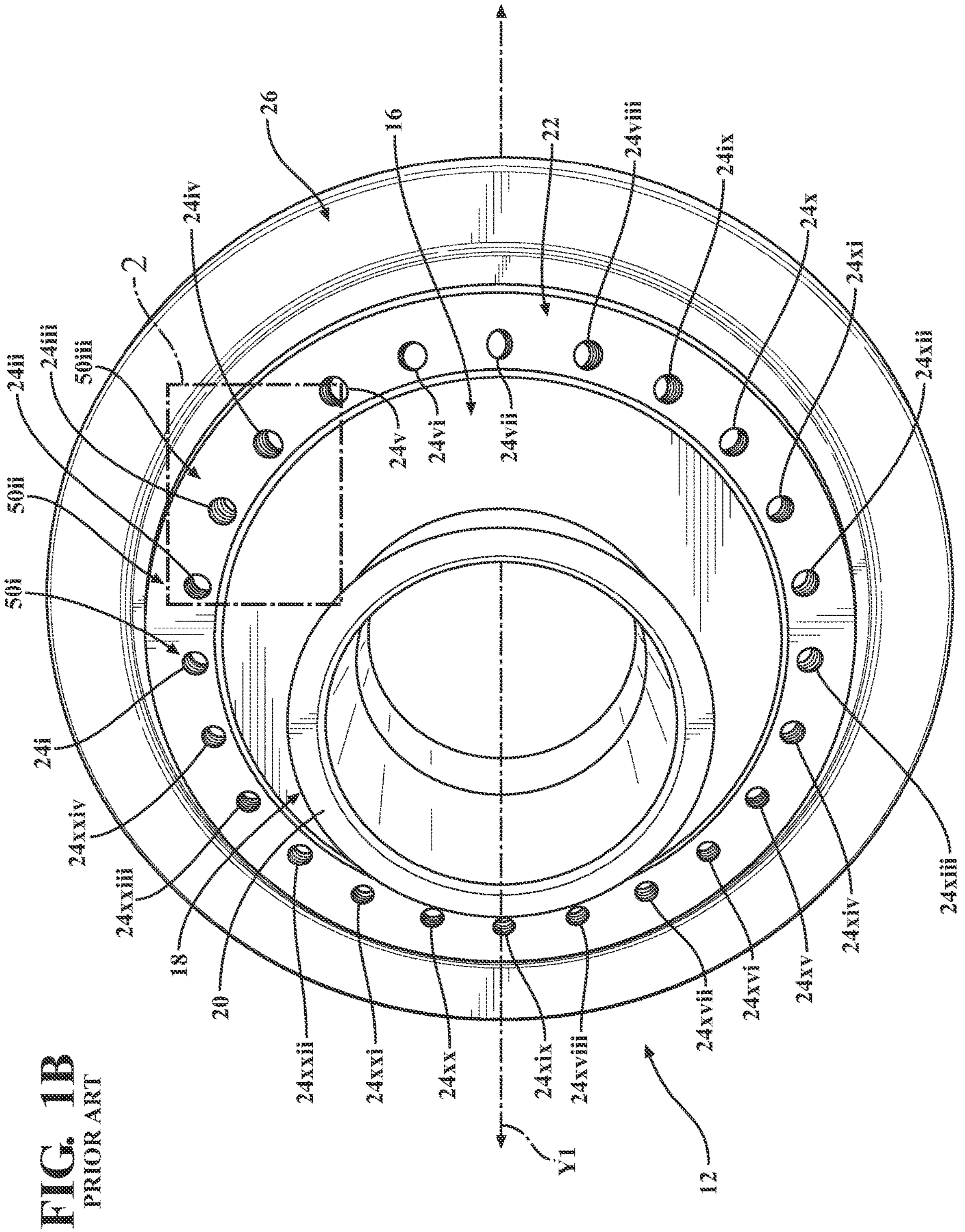
FIG. 1B PRIOR ART
FIG. 1B is a perspective view of a lower clamp ring in the known (prior art) clamp ring assembly.
Figure 2:
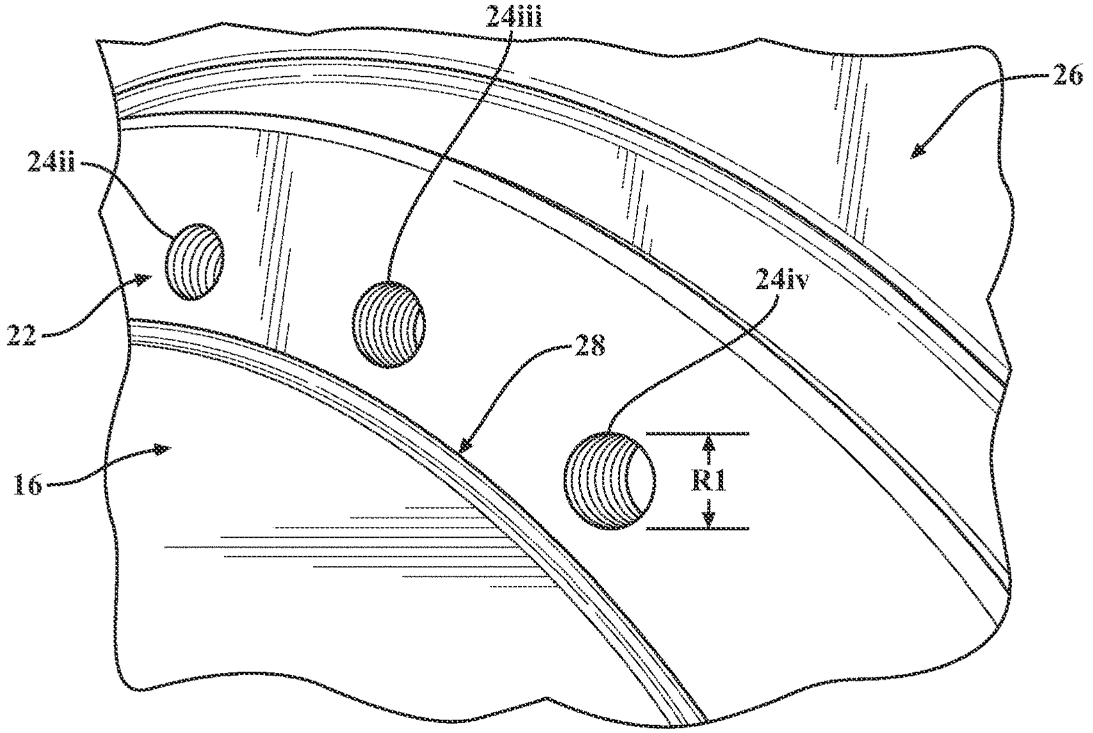
FIG. 2 PRIOR ART
FIG. 2 is an enlargement of the area of detail identified in FIG. 1B.
Figure 3:
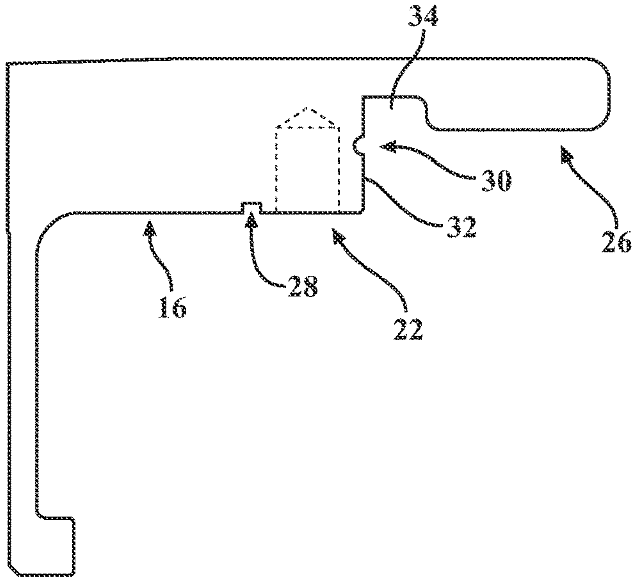
FIG. 3 PRIOR ART
FIG. 3 is a partial, axial (vertical) cross-sectional view of the lower clamp ring seen in FIG. 1B.

The lower clamp ring 12 includes: an inner section 16 with a (first) receiver 18 that defines a (first) receptacle (e.g., a conduit) 20 extending along a longitudinal (vertical) axis Y1 of the lower clamp ring 12; an intermediate section 22, which includes a plurality of (first) openings 24 and is spaced radially outward from the inner section 16; and outer section (e.g., a rim) 26, which is spaced radially outward from the intermediate section 22. The lower clamp ring 12 further includes; a (first) groove 28 (FIG. 3), which is annular (or generally annular) in configuration and is located at the interface between the inner section 16 and the intermediate section 22; a (second) groove 30, which is annular (or generally annular) in configuration and is formed in an outer wall 32 of the intermediate section 22; and a well 34, which is annular (or generally annular) in configuration and is located between the intermediate section 22 and the outer section 26 such that the well 34 extends radially outward from the outer wall 32 of the intermediate section 22. As seen in FIG. 3, the groove 28 extends in parallel (or generally parallel) relation to the longitudinal axis Y1 and the groove 30 extends in orthogonal (or generally orthogonal) relation to the longitudinal axis Y1 (and the groove 28).

The upper clamp ring 14 includes an inner section 36 with a (second) receiver 38 that defines a receptacle (conduit) 40 extending along a longitudinal (vertical) axis Y2 of the upper clamp ring 14; an intermediate section 42, which includes a plurality of (second) openings 44 and is spaced radially outward from the inner section 36; and outer section (rim) 46, which is spaced radially outward from the intermediate section 42.

Figure 8:
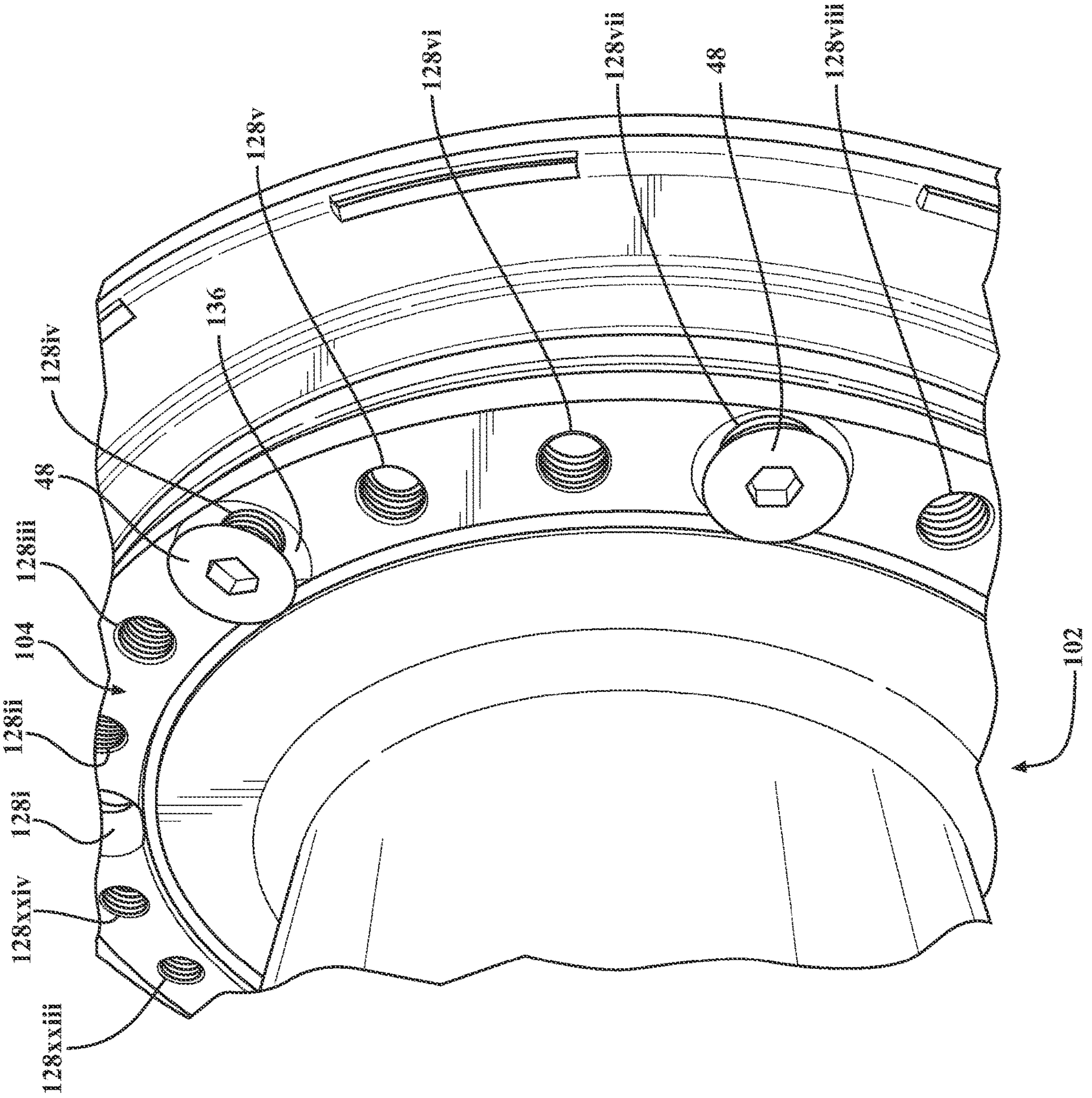
FIG. 8 is a partial, perspective view of the lower clamp ring seen in FIG. 4B shown with the lower insert ring seen in FIG. 7A.

Each of the openings 24, 44 defines a radial dimension (e.g., a diameter) R1 (FIGS. 1A, 2) and is threaded (tapped), which allows for the removable insertion of (threaded) bolts 48 (FIG. 8). As described in further detail below, the openings 24, 44 are arranged into a plurality of respective bolt patterns 50, 52 that are (rotationally) offset from each other by an equivalent (or approximately equivalent) angular distance. For example, in the particular embodiment illustrated, the lower clamp ring 12 includes twenty four openings 24*i*-24*xxiv* that are arranged into three (e.g., respective first, second, and third) bolt patterns 50*i*-50*iii*, each of which includes eight of the openings 24, and the upper clamp ring 14 includes twenty four openings 44*i*-44*xxiv* that are arranged into three (e.g., respective fourth, fifth, and sixth) bolt patterns 52*i*-52*iii*, each of which includes eight of the openings 44. More specifically, the (first) bolt pattern 50*i* is comprised of the openings 24*i*, 24*iv*, 24*vii*, 24*x*, 24*xiii*, 24*xvi*, 24*xix*, and 24*xxii*, the (second) bolt pattern 50*ii* is comprised of the openings 24*ii*, 24*v*, 24*viii*, 24*xi*, 24*xiv*, 24*xvii*, 24*xx*, and 24*xxiii*, and the (third) bolt pattern 50*iii* is comprised of the openings 24*iii*, 24*vi*, 24*vix*, 24*xii*, 24*xv*, 24*xviii*, 24*xxi*, and 24*xxiv*, and the (fourth) bolt pattern 52*i* is comprised of the openings 44*i*, 44*iv*, 44*vii*, 44*x*, 44*xiii*, 44*xvi*, 44*xix*, 44*xxii*, the (fifth) bolt pattern 52*ii* is comprised of the openings 44*ii*, 44*v*, 44*viii*, 44*xi*, 44*xiv*, 44*xvii*, 44*xx*, and 44*xxiii*, and the (sixth) bolt pattern 52*iii* is comprised of the openings 44*iii*, 44*vi*, 44*vix*, 44*xii*, 44*xv*, 44*xviii*, 44*xxi*, and 44*xxiv*. As a result, the bolt patterns 50*i*, 50*ii*, 50*iii* and the bolt patterns 52*i*, 52*ii*, 52*iii* are (rotationally) offset from each other by an angular distance of (approximately) 450 (i.e., 360° divided by the number openings 24, 44 times the number of bolt patterns 50, 52) and the openings 24*i*-24*xxiv* and the openings 44*i*-44*xxiv* are (rotationally) offset from each other by an angular distance of (approximately) 150 (i.e., 360° divided by the number of openings 24, 44). It should be appreciated, however, that the particular number of bolt patterns 50, 52 and/or openings 24, 44 respectively included on the clamp rings 12, 14 may be varied in alternate embodiments without departing from the scope of the present disclosure. As such, embodiments are envisioned herein in which the number of bolt patterns 50, 52 and/or the number of openings 24, 44 may be increased or decreased. Additionally, while the clamp rings 12, 14 are illustrated as including identical numbers of openings 24, 44 and bolt patterns 50, 52, respectively, embodiments are also envisioned herein in which the clamp rings 12, 14 may include non-identical number of openings 24, 44 and bolt patterns 50, 52, respectively. For example, in various embodiments of the disclosure, it is envisioned that the number of openings 24 and/or bolt patterns 50 on the clamp ring 12 may exceed the number of openings 44 and/or bolt patterns 52 on the clamp ring 14 or that the number of openings 44 and/or bolt patterns 52 on the clamp ring 14 may exceed the number of openings 24 and/or bolt patterns 50 on the clamp ring 12.

During use of the clamp ring assembly 10, the aforementioned bolts 48 are threaded into the openings 24, 44. To increase the usable life of the clamp ring assembly 10, the bolts 48 are initially connected to clamp rings 12, 14 via insertion into the openings 24, 44 comprising the bolt patterns 50*i*, 52*i*, respectively. Upon appropriate wear of the openings 24, 44 (e.g., via repeated insertion and removal of the bolts 48), the bolt patterns 50*i*, 52*i* are abandoned and the bolts 48 are subsequently connected to clamp rings 12, 14 via the openings 24, 44 comprising the bolt patterns 50*ii*, 52*ii*, respectively. Thereafter, upon appropriate wear, the bolt patterns 50*ii*, 52*ii* are abandoned and the bolts 48 are subsequently connected to clamp rings 12, 14 via the openings 24, 44 comprising the bolt patterns 50*iii*, 52*iii*, respectively. Thereafter, upon appropriate wear, the clamp ring assembly 10 must be discarded and replaced, which results in increased costs of use. The present disclosure addresses this deficiency, however, and describes an improved clamp ring assembly 100, which will now be discussed with reference to FIGS. 4A-8.

The clamp ring assembly 100 is substantially similar in both structure and function to the clamp ring assembly 10 (FIGS. 1A-3) discussed above and, accordingly, in the interest of brevity, will only be discussed with respect to any differences therefrom. As such, identical reference characters will be utilized to refer to elements, structures, features, etc., common to the clamp ring assemblies 10, 100.

The clamp ring assembly 100 includes: a lower (first) clamp ring 102 (FIG. 4B); a lower (first) insert ring 104 (FIG. 7A), which is configured for removable (releasable) connection to the lower clamp ring 102; an upper (second) clamp ring 106 (FIG. 4A); and an upper (second) insert ring 108 (FIG. 7B), which is configured for removable (releasable) connection to the upper clamp ring 106.

To support use with a variety of tires, it is envisioned that the clamp rings 102, 106 may be provided in a variety of sizes. For example, it is envisioned that the clamp rings 102, 106 may define respective transverse cross-sectional dimensions (e.g., diameters) D1, D2 that lie substantially within the range of (approximately) 10 inches to (approximately) 24 inches, which may be either equal or unequal. For example, in various embodiments of the disclosure, it is envisioned that the clamp rings 102, 106 may be configured such that the transverse cross-sectional dimension D1 exceeds the transverse cross-sectional dimension D2, such that the transverse cross-sectional dimension D2 exceeds the transverse cross-sectional dimension D1, or such that the transverse cross-sectional dimensions D1, D2 are equal (or approximately equal).

Figure 6:
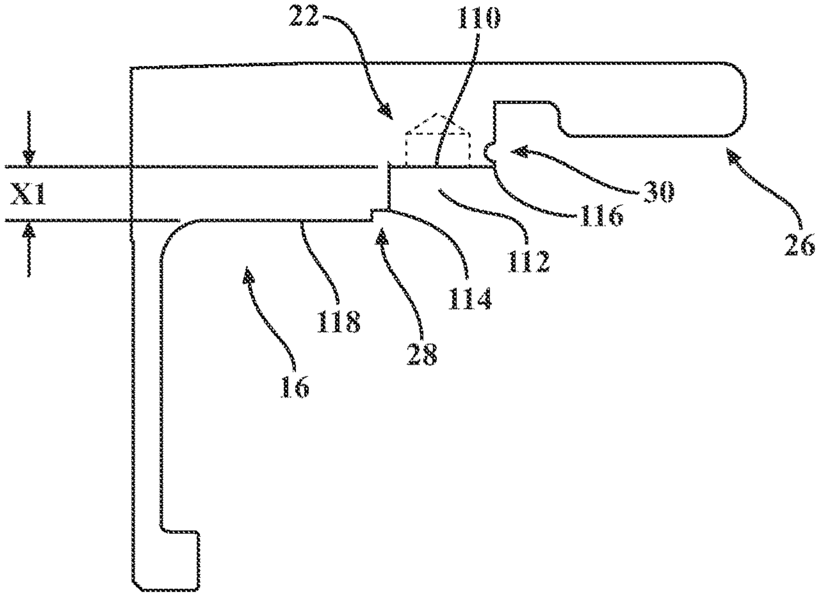
FIG. 6 is a partial, axial (vertical) cross-sectional view of the lower clamp ring seen in FIG. 4B.

The lower clamp ring 102 includes (defines) a plurality of openings 110 and a lower (first) channel 112, which is annular (or generally annular) in configuration and is configured to receive the lower insert ring 104 (FIGS. 7A, 8) such that the lower insert ring 104 is removably positionable within the lower channel 112. As seen in FIGS. 4B-6, the lower channel 112 is formed in the intermediate section 22 of the lower clamp ring 102 and is located between the grooves 28, 30 (FIG. 6). More specifically, the lower channel 112 defines an inner radial edge 114, which is located adjacent (or generally adjacent) to the groove 28 (e.g., at the interface between the inner section 16 and the intermediate section 22), and an outer radial edge 116, which is located adjacent (or generally adjacent) to the groove 30 (e.g., at the interface between intermediate section 22 and the outer section 26). The lower channel 112 is formed (configured) such that the openings 110 are located therein. More specifically, the lower channel 112 defines a radial dimension (width) R2, which extends in orthogonal (or generally orthogonal) relation to the longitudinal axis Y1 (FIG. 1B) and exceeds the radial dimension R1 defined by the openings 110 (e.g., such that the lower channel 112 entirely spans the openings 110), and an axial dimension (depth) X1, which extends in parallel (or generally parallel) relation to the longitudinal axis Y1 and extends from an outer surface 118 defined by the inner section 16 to the groove 30. In the particular embodiment illustrated, the lower channel 112 is configured such that the axial dimension X1 lies substantially within the range of (approximately) 14 inch to (approximately) 1% inch (e.g., (approximately) 0.375 inches). It should be appreciated, however, that the particular dimensions of the lower channel 112 may be varied in alternate embodiments without departing from the scope of the present disclosure. As such embodiments in which the axial dimension X1 of the lower channel 112 may lie outside of the disclosed range are also envisioned herein.

Figure 4A:
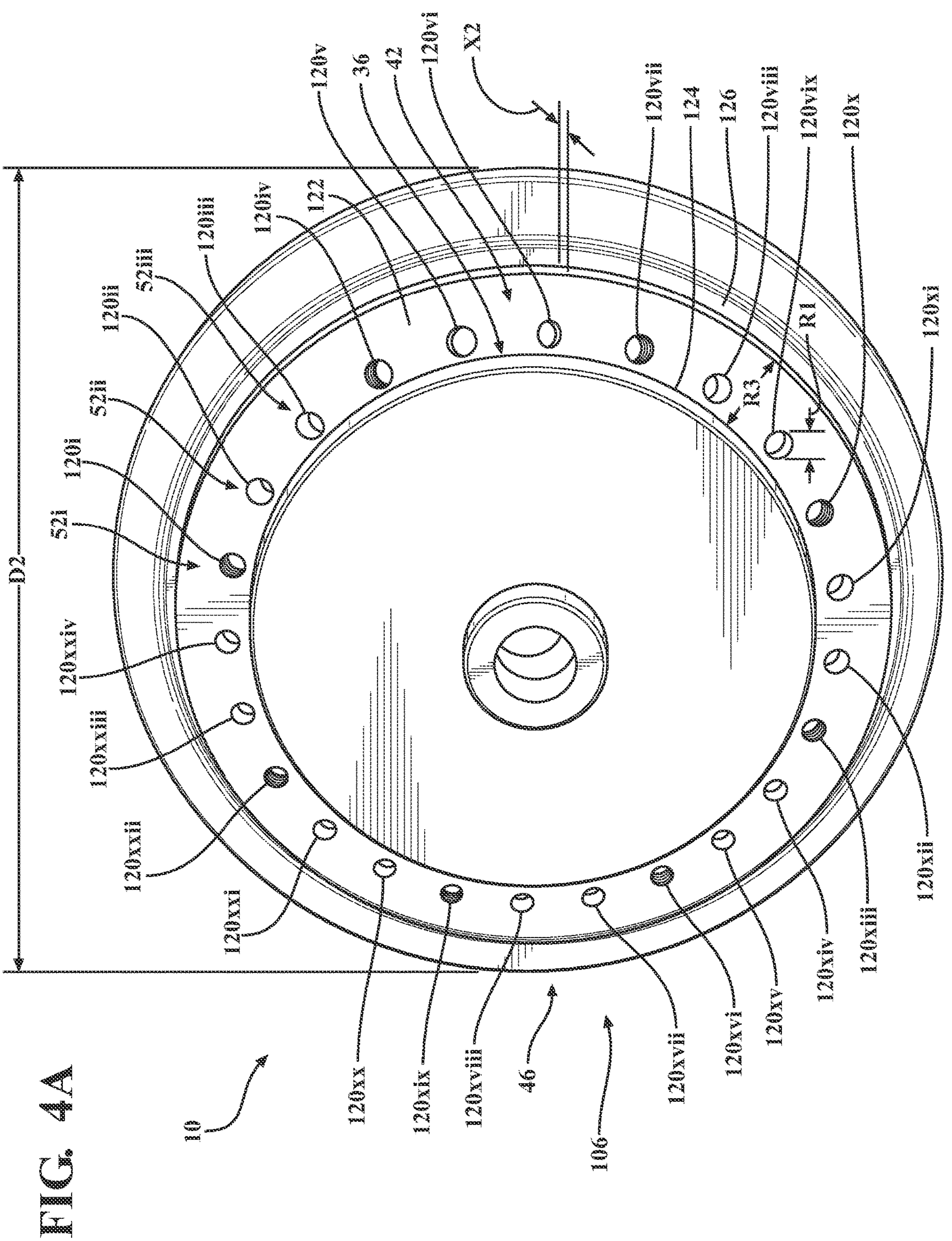
FIG. 4A is a perspective view of an upper clamp ring in a clamp ring assembly according to the principles of the present disclosure.
Figure 4B:
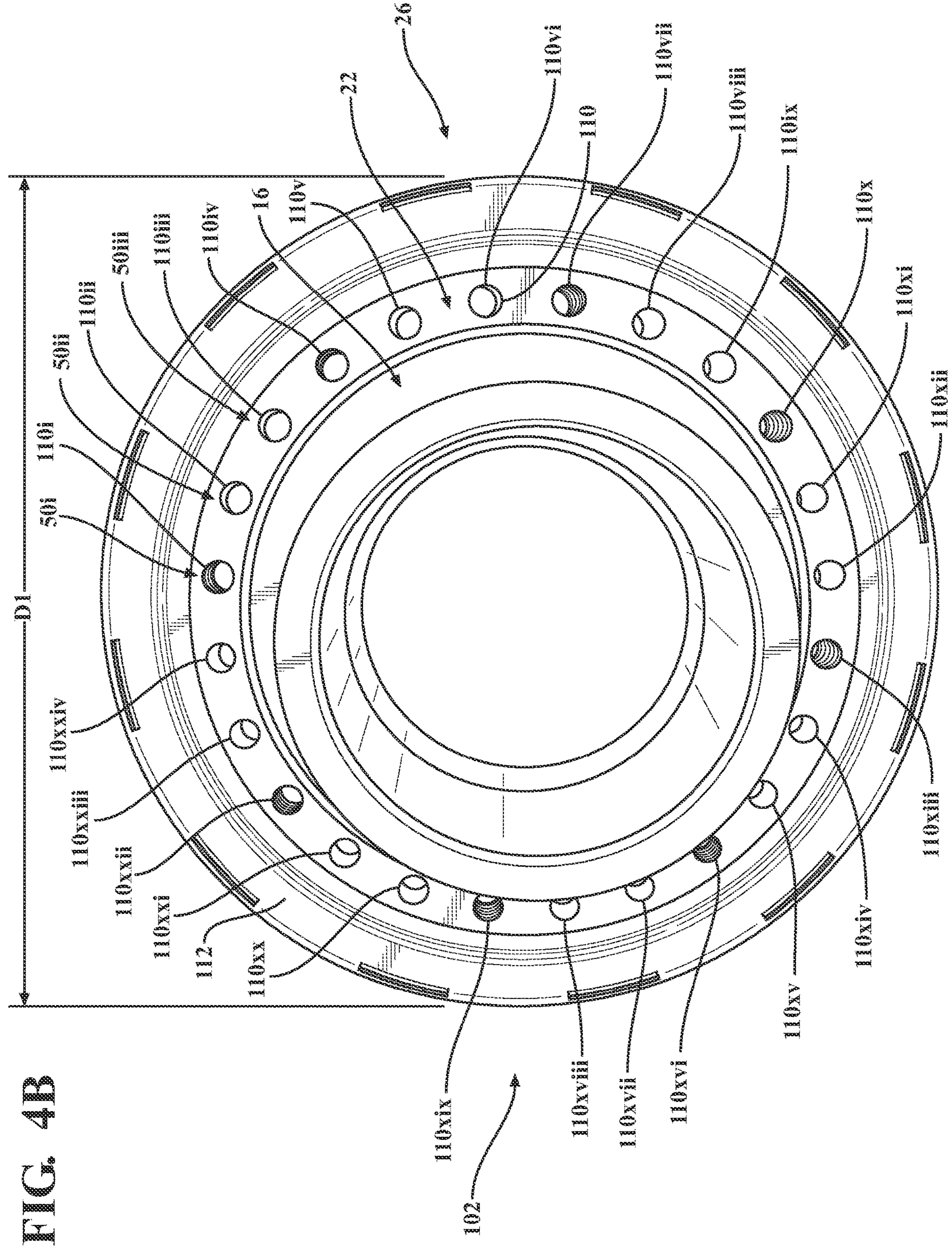
FIG. 4B is a perspective view of a lower clamp ring in the clamp ring assembly according to the principles of the present disclosure.
Figure 5:
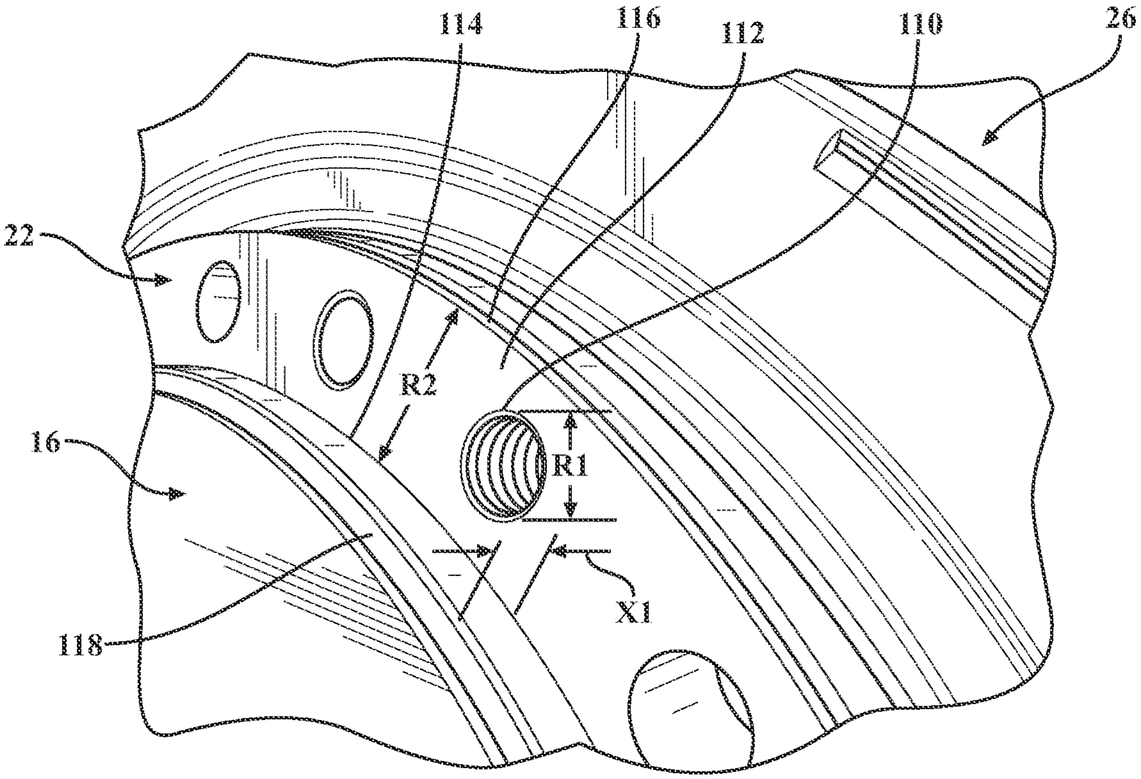
FIG. 5 is a partial, perspective view of the lower clamp ring seen in FIG. 4B.

The upper clamp ring 106 includes (defines) a plurality of openings 120 and an upper (second) channel 122, which is annular (or generally annular) in configuration and is configured to receive the upper insert ring 108 (FIG. 7B) such that the upper insert ring 108 is removably positionable within the upper channel 122. As seen in FIG. 4A, the upper channel 122 is formed in the intermediate section 42 of the upper clamp ring 106 and defines an inner radial edge 124, which is located at the interface between the inner section 36 and the intermediate section 42, and an outer radial edge 126, which is located at the interface between the intermediate section 42 and the outer section 46. The upper channel 122 is formed (configured) such that the openings 120 are located therein. More specifically, the upper channel 122 defines a radial dimension (width) R3, which extends in orthogonal (or generally orthogonal) relation to the longitudinal axis Y2 (FIG. 1A) and exceeds the radial dimension R1 defined by the openings 120 (e.g., such that the upper channel 122 entirely spans the openings 120), and an axial dimension (depth) X2, which extends in parallel (or generally parallel) relation to the longitudinal axis Y2. In the particular embodiment illustrated, the upper channel 122 is configured such that the axial dimension X2 lies substantially within the range of (approximately) 14 inch to (approximately) 1%2 inch (e.g., (approximately) 0.375 inches). It should be appreciated, however, that the particular dimensions of the upper channel 122 may be varied in alternate embodiments without departing from the scope of the present disclosure. As such embodiments in which the axial dimension X2 of the upper channel 122 may lie outside of the disclosed range are also envisioned herein.

The channels 112, 122 may be formed through any suitable method of manufacture. For example, it is envisioned that the channels 112, 122 may be formed via the removal of material from the respective clamp rings 102, 106, or, alternatively, that the channels 112, 122 may be formed during manufacture of the respective clamp rings 102, 106 (e.g., during machining, casting, etc.).

In contrast to the clamp ring assembly 10 discussed above with respect to FIGS. 1A-3, in which each of the openings 24, 44 is threaded, the clamp rings 102, 106 include both threaded and non-threaded openings 110, 120, respectively. More specifically, in the particular embodiment illustrated, the bolt patterns 50*i*, 52*i* (FIG. 1B) include threaded openings 110*i*, 110*iv*, 110*vii*, 110*x*, 110*xiii*, 110*xvi*, 110*xix*, 110*xxii*, 120*i*, 120*iv*, 120*vii*, 120*x*, 120*xiii*, 120*xvi*, 120*xix*, 120*xxii*, and the bolt patterns 50*ii*, 50*iii* and 52*ii*, 52*iii* included non-threaded openings 110*ii*, 110*iii*, 110*v*, 110*vi*, 110*viii*, 110*ix*, 110*xi*, 110*xii*, 110*xiv*, 110*vx*, 110*xvii*, 110*vxiii*, 110*xx*, 110*xxi*, 110*xxiii*, 110*xxiv* and 120*ii*, 120*iii*, 120*v*, 120*vi*, 120*viii*, 120*ix*, 120*xi*, 120*xii*, 120*xiv*, 120*vx*, 120*xvii*, 120*vxiii*, 120*xx*, 120*xxi*, 120*xxiii*, 120*xxiv*, respectively. The removal (absence) of threading on the openings 110*ii*, 110*iii*, 110*v*, 110*vi*, 110*viii*, 110*ix*, 110*xi*, 110*xii*, 110*xiv*, 110*vx*, 110*xvii*, 110*vxiii*, 110*xx*, 110*xxi*, 110*xxiii*, 110*xxiv* and 120*ii*, 120*iii*, 120*v*, 120*vi*, 120*viii*, 120*ix*, 120*xi*, 120*xii*, 120*xiv*, 120*vx*, 120*xvii*, 120*vxiii*, 120*xx*, 120*xxi*, 120*xxiii*, and 120*xxiv* inhibits (if not entirely prevents) interference with insertion of the bolts 48 (FIG. 8), as described in further detail below.

Figure 7A:
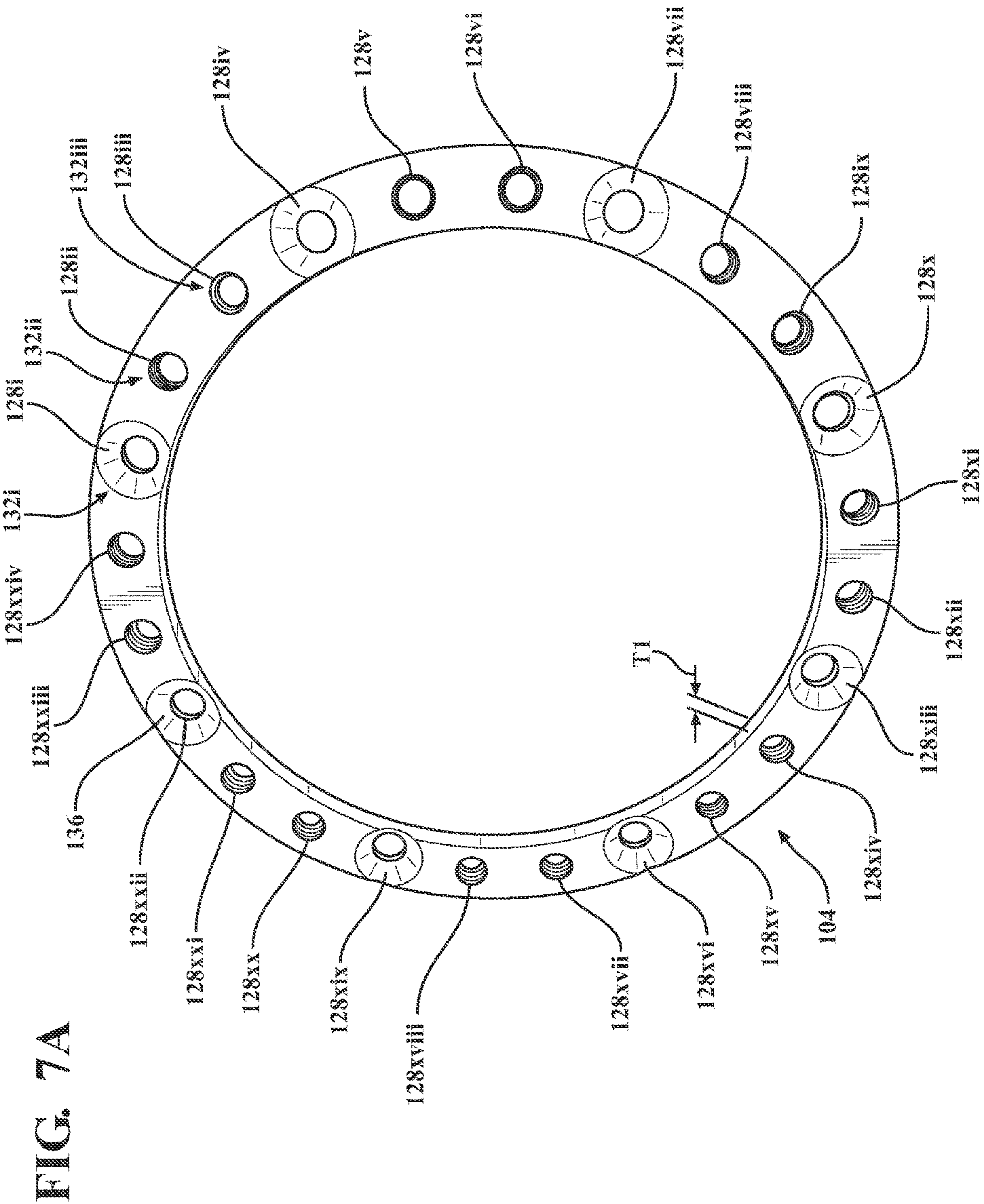
FIG. 7A is a perspective view of a lower insert ring for use with the lower clamp ring seen in FIG. 4B.
Figure 7B:
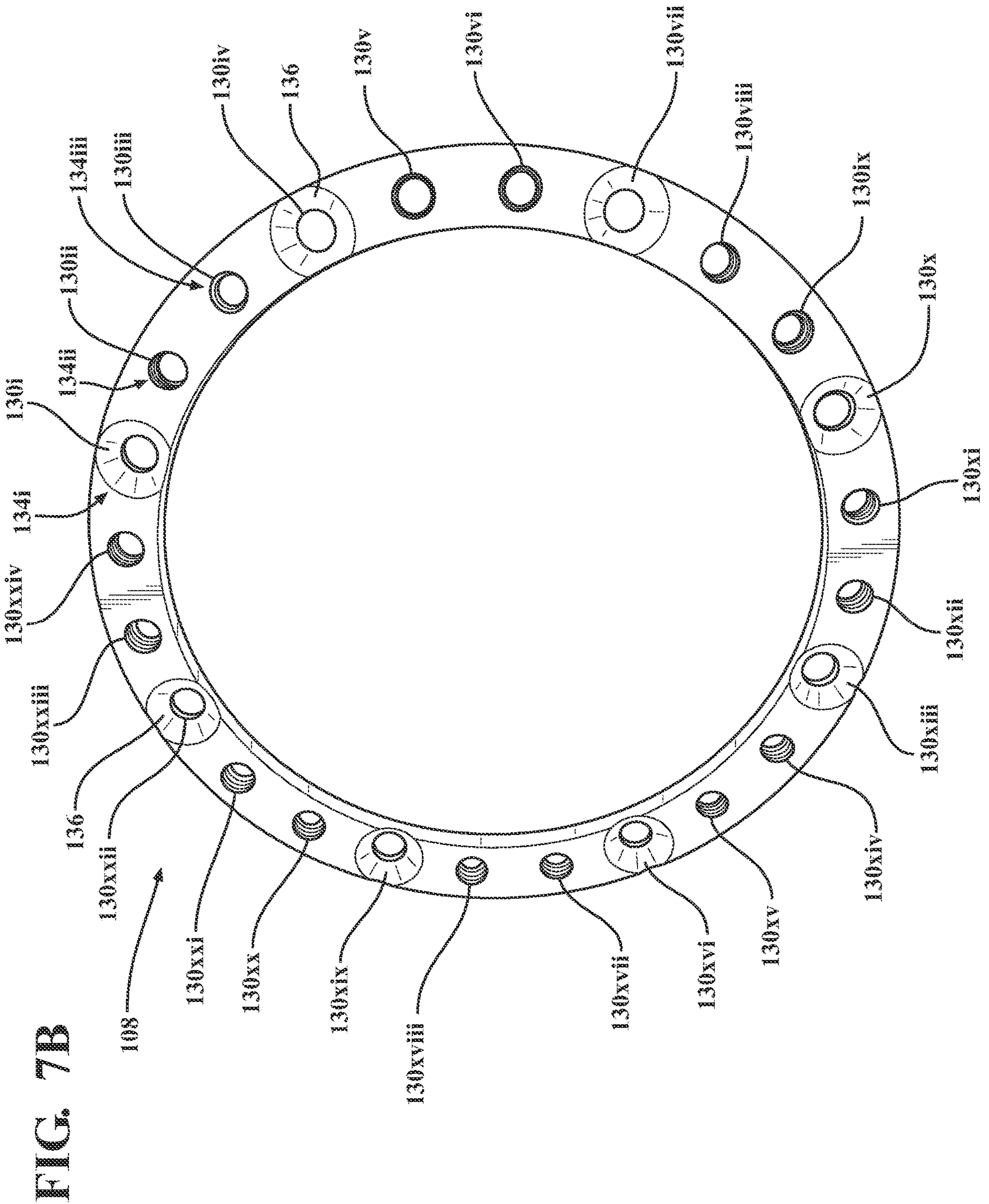
FIG. 7B is a perspective view of an upper insert ring for use with the upper clamp ring seen in FIG. 4A.

With reference now to FIGS. 7A, 7B, and 8 in particular, the respective lower and upper insert rings 104, 108 will be discussed. In the particular embodiment of the disclosure illustrated, the insert rings 104, 108 are identical (or substantially identical) in configuration and, as such, in the interest of brevity, certain details regarding the insert ring 108 may be eliminated. It should be appreciated, however, that the following discussion is equally applicable to both the lower insert ring 104 and the upper insert ring 108.

The lower insert ring 104 is annular (or generally annular) in configuration and is configured for removable positioning within the lower channel 112 (FIG. 4B) (the upper insert ring 108 is likewise annular (or generally annular) in configuration and is configured for removable positioning within the upper channel 122). The lower insert ring 104 defines an axial dimension (thickness) T1, which extends in parallel (or generally parallel) relation to the longitudinal axis Y1 (FIG. 1B) of the lower clamp ring 102. In the particular embodiment illustrated, the lower insert ring 104 is configured such that the axial dimension T1 corresponds to (e.g., is equal (or approximately) equal to) the axial dimension X1 (FIG. 5) defined by the lower channel 112 and, as such, lies substantially within the range of (approximately) ¼ inch to (approximately) ½ inch (e.g., (approximately) 0.375 inches). It should be appreciated, however, that the particular dimensions of the lower insert ring 104 may be varied in alternate embodiments without departing from the scope of the present disclosure. As such, embodiments in which the axial dimension T1 may lie outside of the disclosed range are also envisioned herein. Embodiments are also envisioned in which the axial dimension T1 may be less than or greater than the axial dimension X1 defined by the lower channel 112.

The lower insert ring 104 includes (defines) a plurality of (third) openings 128, which are both threaded and non-threaded, as described in further detail below, and are configured in correspondence with (e.g., correspond in configuration and location to) the openings 110 (FIG. 4B) in the lower clamp ring 102 such that the openings 110, 128 are (rotatably) alignable. The upper insert ring 108 likewise includes (defines) a plurality of (fourth) openings 130, which are both threaded and non-threaded, as described in further detail below, and are configured in correspondence with (e.g., correspond in configuration and location to) the openings 120 in the upper clamp ring 106 such that the openings 120, 130 are (rotatably) alignable).

The openings 128 are arranged into a plurality of bolt patterns 132 that are (rotationally) offset from each other by an equivalent angular distance such that the bolt patterns 132 correspond to the bolt patterns 50 in the lower clamp ring 102. The openings 130 are likewise arranged into a plurality of bolt patterns 134 such that the bolt patterns 134 correspond to the bolt patterns 52 in the upper clamp ring 106. In the particular embodiment illustrated, the lower insert ring 104 includes twenty four openings 128*i*-128*xxiv* that are arranged into three (e.g., respective seventh, eighth, and ninth) bolt patterns 132*i*-132*iii*, each of which includes eight of the openings 128, and the upper insert ring 108 likewise includes twenty four openings 130*i*-130*xxiv* that are arranged into three (e.g., respective tenth, eleventh, and twelfth) bolt patterns 134*i*-134*iii*, each of which includes eight of the openings 130. More specifically, whereas the (seventh) bolt pattern 132*i* is comprised of non-threaded openings 128*i*, 128*iv*, 128*vii*, 128*x*, 128*xiii*, 128*xvi*, 128*xix*, and 128*xxii*, the (eighth) bolt pattern 132*ii* and the (ninth) bolt pattern 132*iii* are comprised of threaded openings 128*ii*, 128*v*, 128*viii*, 128*xi*, 128*xiv*, 128*xvii*, 128*xx*, 128*xxiii* and threaded openings 128*iii*, 128*vi*, 128*vix*, 128*xii*, 128*xv*, 128*xviii*, 128*xxi*, and 128*xxiv*, respectively. Likewise, whereas the (tenth) bolt pattern 134*i* is comprised of non-threaded openings 130*i*, 130*iv*, 130*vii*, 130*x*, 130*xiii*, 130*xvi*, 130*xix*, and 130*xxii*, the (eleventh) bolt pattern 134*ii* and the (twelfth) bolt pattern 134*iii* are comprised of threaded openings 130*ii*, 130*v*, 130*viii*, 130*xi*, 130*xiv*, 130*xvii*, 130*xx*, 130*xxiii* and threaded openings 130*iii*, 130*vi*, 130*vix*, 130*xii*, 130*xv*, 130*xviii*, 130*xxi*, and 130*xxiv*, respectively. As a result, the bolt patterns 132*i*, 132*ii*, 132*iii* and the bolt patterns 134*i*, 134*ii*, 134*iii* are (rotationally) offset from each other by an equivalent (or approximately equivalent) angular distance of (approximately) 450 (i.e., 3600 divided by the number openings 128 (130) times the number of bolt patterns 132 (134), as discussed above with respect to the clamp rings 12, 14. It should be appreciated, however, that the particular number of bolt patterns 132, 134 and/or openings 128, 130 respectively included on the lower insert ring 104 and the upper insert ring 108 may be varied in alternate embodiments without departing from the scope of the present disclosure. As such, embodiments are envisioned herein in which the number of bolt patterns 132, 134 and/or the number of openings 128, 130 may be increased or decreased. Additionally, while the insert rings 104, 108 are illustrated as including identical numbers of openings 128, 130 and bolt patterns 132, 134, respectively, embodiments are also envisioned herein in which the insert rings 104, 108 may include non-identical number of openings 128, 130 and bolt patterns 132, 134, respectively. For example, in various embodiments of the disclosure, it is envisioned that the number of openings 128 and/or bolt patterns 132 on the insert ring 104 may exceed the number of openings 130 and/or bolt patterns 134 on the insert ring 108 or that the number of openings 130 and/or bolt patterns 134 on the insert ring 108 may exceed the number of openings 128 and/or bolt patterns 132 on the insert ring 104.

During use of the clamp ring assembly 100, the lower insert ring 104 is positioned within the lower channel 112 such that the openings 128 are aligned with the openings 110 (FIG. 4B), and the upper insert ring 108 is likewise positioned within the upper channel 122 such that the openings 130 are aligned with the openings 120. Thereafter, the bolts 48 (FIG. 8) are inserted into the openings 128 (and the openings 130). More specifically, one of the bolt patterns 132 (e.g., the bolt pattern 132*i*) and one of the bolt patterns 50 (e.g., the bolt pattern 50*i*) is utilized to connect the lower insert ring 104 to the lower clamp ring 102 by inserting a (first) plurality of the bolts 48 through the non-threaded openings 128*i*, 128*iv*, 128*vii*, 128*x*, 128*xiii*, 128*xvi*, 128*xix*, 128*xxii* and into the threaded openings 110*i*, 110*iv*, 110*vii*, 110*x*, 110*xiii*, 110*xvi*, 110*xix*, 110*xxii*. Likewise, one of the bolt patterns 134 (e.g., the bolt pattern 134*i*) and one of the bolt patterns 52 (e.g., the bolt pattern 52*i*) is utilized to connect the upper insert ring 108 to the upper clamp ring 106 by inserting a (second) plurality of the bolts 48 through the non-threaded openings 130*i*, 130*iv*, 130*vii*, 130*x*, 130*xiii*, 130*xvi*, 130*xix*, 130*xxii* and into the threaded openings 120*i*, 120*iv*, 120*vii*, 120*x*, 120*xiii*, 120*xvi*, 120*xix*, 120*xxii*.

Figure 10:
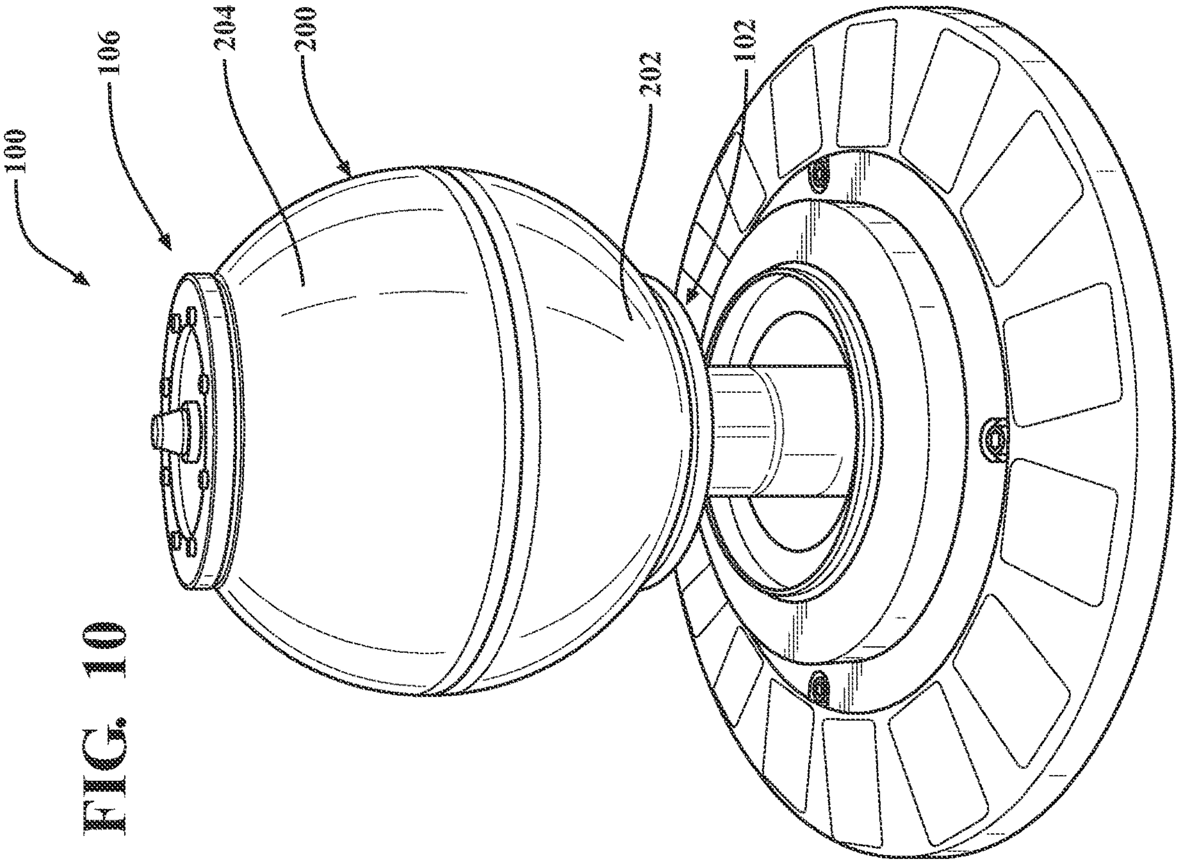
FIG. 10 is a bottom, perspective view illustrating the connection of a tire to the clamp ring assembly.
Figure 9:
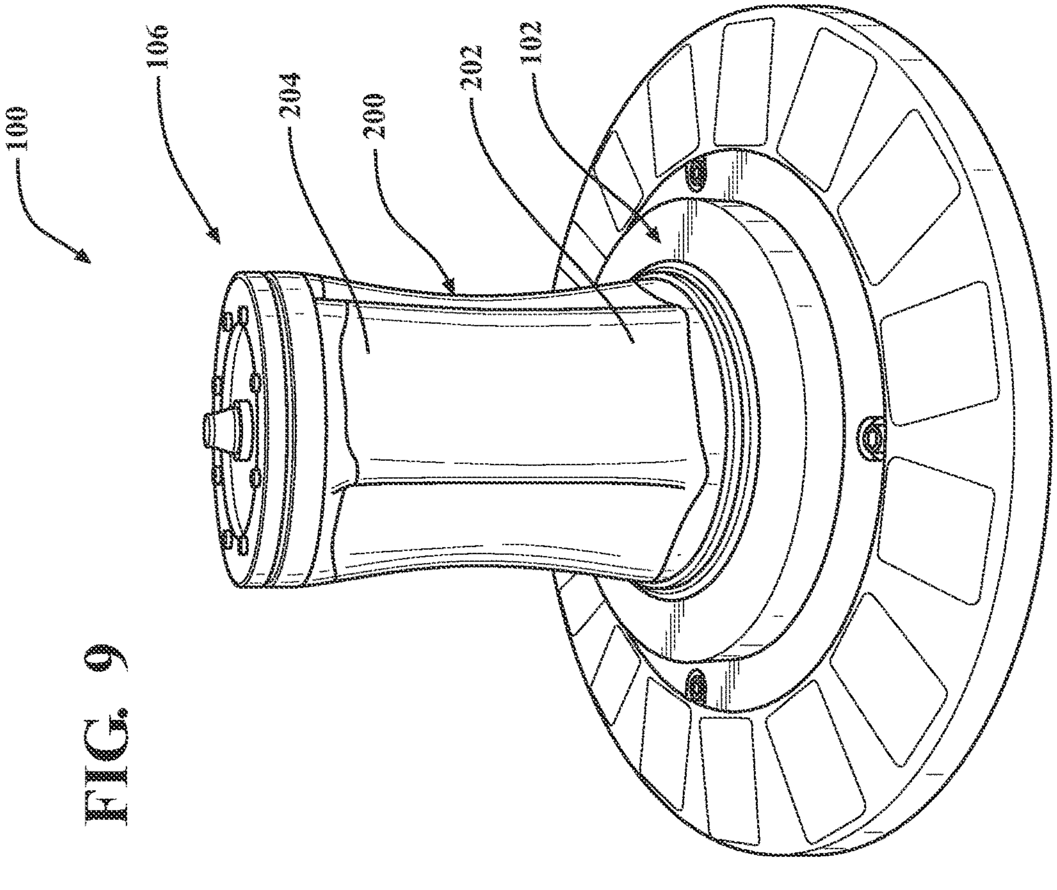
FIG. 9 is a top, perspective view illustrating the connection of a tire to the clamp ring assembly.

Following connection of the lower insert ring 104 to the lower clamp ring 102 and connection of the upper insert ring 108 to the upper clamp ring 106, tire fabrication continues by connecting a tire 200 to the clamp ring assembly 100, as illustrated in FIGS. 9 and 10. More specifically, another of the bolt patterns 132 (e.g., the bolt pattern 132*ii*) is utilized to receive a (third) plurality of the bolts 48, which threadably engage the lower insert ring 104 (via the openings 128*ii*, 128*v*, 128*viii*, 128*xi*, 128*xiv*, 128*xvii*, 128*xx*, 128*xxiii*) and extend into the (non-threaded) bolt pattern 50*ii* in the lower clamp ring 102 (e.g., the openings 110*ii*, 110*v*, 110*viii*, 110*xi*, 110*xiv*, 110*xvii*, 110*xx*, 110*xxiii*), thereby directly connecting a lower end 202 of the tire 200 to the lower insert ring 104 and, thus, indirectly (operatively) connecting the lower end 202 of the tire 200 to the lower clamp ring 102. Consequently, the bolts 48 extending through the tire 200 and into the lower insert ring 104 engage only the lower insert ring 104 and are disengaged from the lower clamp ring 102. The remaining bolt pattern(s) in the lower insert ring 104 (e.g., the bolt pattern 132*iii*) remains open (available) for future use, as described in further detail below.

Likewise, another of the bolt patterns 134 (e.g., the bolt pattern 134*ii*) is utilized to receive a (fourth) plurality of the bolts 48, which threadably engage the upper insert ring 108 (via the openings 130*ii*, 130*v*, 130*viii*, 130*xi*, 130*xiv*, 130*xvii*, 130*xx*, and 130*xxiii*) and extend into the (non-threaded) bolt pattern 52*ii* in the upper clamp ring 106 (e.g., the openings 120*ii*, 120*v*, 120*viii*, 120*xi*, 120*xiv*, 120*xvii*, 120*xx*, 120*xxiii*, thereby directly connecting an upper end 204 of the tire 200 to the upper insert ring 108 and, thus, indirectly (operatively) connecting the upper end 204 of the tire 200 to the upper clamp ring 106. Consequently, the bolts 48 extending through the tire 200 and into the upper insert ring 108 engage only the upper insert ring 108 and are disengaged from the upper clamp ring 106. The remaining bolt pattern(s) in the upper insert ring 108 (e.g., the bolt pattern 134*iii*) remains open (available) for future use, as described in further detail below.

As indicated above, the absence (e.g., removal, elimination) of threading from the openings 128*i*, 128*iv*, 128*vii*, 128*x*, 128*xiii*, 128*xvi*, 128*xix*, and 128*xxii* in the lower insert ring 104 and the openings 130*i*, 130*iv*, 130*vii*, 130*x*, 130*xiii*, 130*xvi*, 130*xix*, and 130*xxii* in the upper insert ring 108 inhibits (if not entirely prevents) interference with insertion of the bolts 48 that may otherwise result (e.g., from axial misalignment of the thread patterns, mismatched, pitch, etc.) during connection of the insert rings 104, 108 to the clamp rings 102, 106, respectively, thereby facilitating and simplifying assembly. Similarly, the removal (elimination) of threading from the openings 110*ii*, 110*iii*, 110*v*, 110*vi*, 110*viii*, 110*ix*, 110*xi*, 110*xii*, 110*xiv*, 110*vx*, 110*xvii*, 110*vxiii*, 110*xx*, 110*xxi*, 110*xxiii*, and 110*xxiv* in the lower clamp ring 102 and the openings 120*ii*, 120*iii*, 120*v*, 120*vi*, 120*viii*, 120*ix*, 120*xi*, 120*xii*, 120*xiv*, 120*vx*, 120*xvii*, 120*vxiii*, 120*xx*, 120*xxi*, 120*xxiii* and 120*xxiv* in the upper clamp ring 106 inhibits (if not entirely prevents) interference with insertion of the bolts 48 that may otherwise result (e.g., from axial misalignment of the thread patterns, mismatched, pitch, etc.) during connection of the tire 200 to the insert rings 104, 108, respectively, thereby facilitating and simplifying assembly.

In certain embodiments of the disclosure, it is envisioned that the openings 128, 130 in one of the bolt patterns 132, 134 (e.g., the bolt patterns 132*i*, 134*i*) may include countersinks 136 (e.g., to enhance the connection between the insert rings 104, 108 and the clamp rings 102, 106, respectively), as illustrated in FIGS. 7A, 7B. As such, embodiments are envisioned herein in which the openings 128 in the lower insert ring 104 and the openings 130 included in the upper insert ring 108 may be non-identical. It should be appreciated, however, that the countersinks 136 may be eliminated in alternate embodiments of the disclosure (e.g., to reduce fabrication or other manufacturing costs), and that the present disclosure envisions embodiments in which the openings 128 in the lower insert ring 104 and the openings 130 included in the upper insert ring 108 may be identical (e.g., embodiments in which each of the openings 128, 130 may include, or may be devoid of, the countersinks 136).

To increase the usable life of the clamp ring assembly 100, upon appropriate wear of the openings 128 in the bolt pattern 132*ii* and the openings 130 in the bolt pattern 134*ii* (e.g., via repeated insertion and removal of the bolts 48 during connection and disconnection of the tire 200 (FIGS. 9, 10)), the bolt patterns 132*ii*, 134*ii* are is abandoned, and the bolts 48 are subsequently inserted into the lower insert ring 104 via the openings 128 comprising the bolt pattern 132*iii* and into the upper insert ring 108 via the openings 130 comprising the bolt pattern 134*iii*. Thereafter, upon appropriate wear of the openings 128 in the bolt pattern 132*iii* and the openings 130 in the bolt pattern 134*iii* (e.g., via repeated insertion and removal of the bolts 48 during connection and disconnection of the tire 200), the insert rings 104, 108 may be removed and replaced, which allows for continued use of the clamp rings 102, 106, thereby extending the usable life of the clamp ring assembly 100.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by any claims that follow and includes all equivalents of the subject matter of any claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design. For example, the term "generally parallel" should be understood as referring to configurations in with the pertinent components are oriented so as to define an angle therebetween that is equal to 180°±25% (e.g., an angle that lies within the range of (approximately) 135° to (approximately) 225°) and the term "generally orthogonal" should be understood as referring to configurations in with the pertinent components are oriented so as to define an angle therebetween that is equal to 90°±25% (e.g., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Any claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A method of assembling a clamp ring assembly, the method comprising:

connecting a first insert to a first clamp ring, wherein the first clamp ring includes threaded openings and non-threaded openings;

connecting the first insert to a first end of a tire;

connecting a second insert to a second clamp ring, wherein the second clamp ring includes both threaded openings and non-threaded openings; and connecting the second insert to a second end of the tire such that the tire is positioned between the first clamp ring and the second clamp ring during fabrication.

2. The method of claim 1, wherein connecting the first insert to the first clamp ring includes inserting the first insert into the first clamp ring, and connecting the second insert to the second clamp ring includes inserting the second insert into the second clamp ring.

3. The method of claim 2, further including:

inserting bolts into the threaded openings defined by the first insert and the second insert.

4. The method of claim 2, wherein connecting the first insert to the first clamp ring includes removably inserting the first insert into the first clamp ring, and wherein connecting the second insert to the second clamp ring includes removably inserting the second insert into the second clamp ring.

5. A clamp ring assembly for use during tire fabrication, the clamp ring assembly comprising:

a first clamp ring including:

a first bolt pattern including threaded openings;

a second bolt pattern including non-threaded openings; and a third bolt pattern including non-threaded openings;

a first insert ring including:

a fourth bolt pattern including non-threaded openings;

a fifth bolt pattern including threaded openings; and a sixth bolt pattern including threaded openings, the first insert ring being configured for removable connection to the first clamp ring via insertion of a first set of bolts through the fourth bolt pattern and into the first bolt pattern, wherein the first insert ring is configured for direct connection to a first end of a tire;

a second clamp ring including:

a seventh bolt pattern including threaded openings;

an eighth bolt pattern including non-threaded openings; and a ninth bolt pattern including non-threaded openings; and a second insert ring including:

a tenth bolt pattern including non-threaded openings;

an eleventh bolt pattern including threaded openings; and a twelfth bolt pattern including threaded openings, the second insert ring being configured for removable connection to the second clamp ring via insertion of a second set of bolts through the tenth bolt pattern and into the seventh bolt pattern, wherein the second insert ring is configured for direct connection to a second end of the tire such that the tire is positioned between the first clamp ring and the second clamp ring during fabrication.

6. The clamp ring assembly of claim 5, wherein the openings in the first insert ring are configured in correspondence with the openings in the first clamp ring and the openings in the second insert ring are configured in correspondence with the openings in the second clamp ring.

7. The clamp ring assembly of claim 5, wherein the first insert ring and the second insert ring are identical.

8. The clamp ring assembly of claim 5, wherein the second bolt pattern is rotationally offset from the first bolt pattern and the third bolt pattern is rotationally offset from the second bolt pattern, wherein the fifth bolt pattern is rotationally offset from the fourth bolt pattern and the sixth bolt pattern is rotationally offset from the fifth bolt pattern, wherein the eighth bolt pattern is rotationally offset from the seventh bolt pattern and the ninth bolt pattern is rotationally offset from the eighth bolt pattern, wherein the eleventh bolt pattern is rotationally offset from the tenth bolt pattern and the twelfth bolt pattern is rotationally offset from the eleventh bolt pattern.

9. The clamp ring assembly of claim 5, wherein each of the first bolt pattern, the second bolt pattern, the third bolt pattern, the fourth bolt pattern, the fifth bolt pattern, the sixth bolt pattern, the seventh bolt pattern, the eighth bolt pattern, the ninth bolt pattern, the tenth bolt pattern, the eleventh bolt pattern, and the twelfth bolt pattern includes eight openings.

10. A clamp ring assembly for use during tire fabrication, the clamp ring assembly comprising:

a first clamp ring including first openings, wherein the first openings include threaded openings and non-threaded openings;

a first insert configured for insertion into the first clamp ring, wherein the first insert is configured for direct connection to a first end of a tire;

a second clamp ring including second openings, wherein the second openings are both threaded and non-threaded; and a second insert configured for insertion into the second clamp ring, wherein the second insert is configured for direct connection to a second end of the tire such that the tire is positioned between the first clamp ring and the second clamp ring during fabrication.

11. The clamp ring assembly of claim 10, wherein the first insert is removable insertable into the first clamp ring.

12. The clamp ring assembly of claim 11, wherein the second insert is removably insertable into the second clamp ring.

13. The clamp ring assembly of claim 10, wherein the first insert includes third openings are configured in correspondence with the first openings such that the first openings and the third openings are rotationally alignable, wherein the second insert includes fourth openings configured in correspondence with the second openings such that the second openings and the fourth openings are rotationally alignable.

14. The clamp ring assembly of claim 13, wherein the third openings are both threaded and non-threaded and the fourth openings are both threaded and non-threaded.

15. The clamp ring assembly of claim 13, wherein the first openings are arranged so to define a first bolt pattern; a second bolt pattern; and a third bolt pattern, the second bolt pattern being rotationally offset from the first bolt pattern and the third bolt pattern being rotationally offset from the second bolt pattern.

16. The clamp ring assembly of claim 15, wherein the third openings are arranged so to define a fourth bolt pattern; a fifth bolt pattern; and a sixth bolt pattern, the fifth bolt pattern being rotationally offset from the fourth bolt pattern and the sixth bolt pattern being rotationally offset from the fifth bolt pattern.

17. The clamp ring assembly of claim 16, wherein the second openings are arranged so to define a seventh bolt pattern; an eighth bolt pattern; and a ninth bolt pattern, the eighth bolt pattern being rotationally offset from the seventh bolt pattern and the ninth bolt pattern being rotationally offset from the eighth bolt pattern.

18. The clamp ring assembly of claim 17, wherein the fourth openings are arranged so to define a tenth bolt pattern; an eleventh bolt pattern; and a twelfth bolt pattern, the eleventh bolt pattern being rotationally offset from the tenth bolt pattern and the twelfth bolt pattern being rotationally offset from the eleventh bolt pattern.

19. The clamp ring assembly of claim 18, wherein the first clamp ring includes twenty four of the first openings, the first bolt pattern, the second bolt pattern, and the third bolt pattern each including eight of the first openings, wherein the first insert includes twenty four of the third openings, the fourth bolt pattern, the fifth bolt pattern, and the sixth bolt pattern each including eight of the second openings, wherein the second clamp ring includes twenty four of the second openings, the eighth bolt pattern, the ninth bolt pattern, and the tenth bolt pattern each including eight of the third openings, and wherein the second insert includes twenty four of the fourth openings, the tenth bolt pattern, the eleventh bolt pattern, and the twelfth bolt pattern each including eight of the fourth openings.

20. The clamp ring assembly of claim 18, wherein:

the first openings in the first bolt pattern are threaded;

the first openings in the second bolt pattern and the third bolt pattern are non-threaded;

the second openings in the seventh bolt pattern are threaded; and the second openings in the eighth bolt pattern and the ninth bolt pattern are non-threaded.

* * * * *